United States Patent Office 3,252,455 Patented May 24, 1966

3,252,455

HYDROGEN FUEL CELL AND GENERATOR

Hamilton L. J. Marshall, P.O. Box 961, Mobile, Ala.

No Drawing. Filed Sept. 24, 1964, Ser. No. 399,100
8 Claims. (Cl. 126—263)

This invention relates to a novel hydrogen fuel cell and generator.

The art of generating hydrogen as a fuel has been known to the industry for many years and attempts have been made to generate hydrogen for fuel by various methods. The earliest such method is the electrolytic cell using the principle of decomposing water to its main elements of hydrogen and oxygen by means of electrolysis. Other methods have been employed including the latest of breaking down the structure of methyl alcohol to hydrogen, carbon mono and dioxide. All these methods are successful in producing hydrogen. However they all possess undesirable handicaps such as expansion of greater energy to produce it than the energy of the product, handling dangers and explosive products, dangerous fumes, bulky storage of inflammable raw materials, and dangerous storage of the produced hydrogen itself. Stored hydrogen is easily ignited by a shock and by static or dynamic electrical discharge. It explodes violently and has great devastating energy as it has been demonstrated by several disasters especially those which occurred in lighter than air crafts.

My invention pertains to a novel method of generating great volumes of hydrogen from materials that are neither inflammable nor explosive. These materials have no obnoxious fumes or vapors and do not require pressurized storage. They cannot be ignited by a shock, static or dynamic electrical discharge. The hydrogen generated is immediately used as fuel and its volume can be regulated to meet the demand in increasing or decreasing volumes.

Metallic sodium decomposes water to hydrogen leaving a residue of sodium hydroxide. The reaction is violent; it is exothermic in nature which causes the resulting hydrogen to ignite and produce a flame of high thermal intensity. This itself makes an ideal fuel; it produces an abundance of hydrogen; it is self igniting; and it is easily controlled by means of increasing or decreasing the amount of sodium metal fed into the water chamber. However sodium metal is a dangerous substance; it oxidizes rapidly in the presence of oxygen and or atmospheric moisture bursting into flames spontaneously. It must be stored in light hydrocarbons such as naptha or kerosene or in nitrogen atmosphere or drying agents such as soda lime.

My invention pertains to a safe method of using sodium metal and water to generate hydrogen fuel of high caloric intensity capable of being used as a means of propulsion of any movable vehicle whether on land, sea, undersea, or air and used through and by any type of engine either steam or gas expansion type of jet in an absolute safe and controlled manner. It is also adaptable to produce heat for stationary motive power for industry, commerce and as a domestic utility. Specifically this method and type of fuel can be useful to produce reasonably economical high intensity thermal energy regardless of its application.

Low melting point alloys have been known to science for a hundred or more years. For many years they were only laboratory curiosities and used only in college and university chemistry and physics laboratories as interesting phenomena. Today they are still of a limited use. They are mainly used as fuses on fire door control mechanisms, some fire alarm systems, and similar devices with the latest application as a holding device or fixture to mount optical glass during the process of grinding and polishing. These alloys have a remarkable high tensile and impart strength and they are machinable.

These alloys are composed mainly of a combination of bismuth, lead, tin, cadmium, and indium. The percentage ratio of each of these metals into the alloy determines the melting point of the resulting alloy. Some of the above mentioned metals are used in some of the alloys to effect a specifically desired melting point. As a matter of interest and expediency, I will mention some of these alloys, their composition, and specific melting points.

(1) 52% bismuth, 32% lead, 16% tin, will produce an alloy having specific melting point of 95° C. or 203° F.

(2) 52% bismuth, 40% lead, 8% cadmium, will produce an alloy having a specific melting point of 91.5° C. or 196.7° F.

(3) 58% bismuth, 17% lead, 25% indium specific melting point 78.8° C. or 173.8° F.

(4) 50% bismuth, 27% lead, 13% tin, 10% cadmium specific melting point 70° C. or 158° F.

(5) 49% bismuth, 18% lead, 12% tin, 21% indium—specific melting point 58° C. or 136.4° F.

(6) 45% bismuth, 23% lead, 8% tin, 5% cadmium, 19% indium—specific melting point 46.7° C. or 116.06° F.

Sodium metal does not react with any of the above mentioned alloys. Also these alloys have a very dense molecular structure as to prevent any oxygen or moisture of passing through the lattice of their molecular structure. They also possess sufficient hardness and ductibility as to prevent abrasions or breaks by normal use or handling. Therefore they offer an ideal medium of incapsulation.

My method of rendering sodium metal controllable and safe to handle and store is by incapsulating an amount of sodium metal in one of the above mentioned alloys. By doing so, I produce pellets, lumps, ingots, or other suitable shapes of the incapsulated sodium metal. Although any of the above mentioned alloys with their specific melting points are suitable for this purpose, I prefer to use the alloy composed of 58% bismuth, 17% lead, and 25% indium to incapsulate the sodium metal to be used in the hydrogen cell or generator. The reason for selecting this metal alloy is because its melting point is 78.8° C. or 173.8° F. This melting point of this alloy is considerably lower than the melting point of the sodium metal which is 97.6° C. or 207.7° F. Therefore, it can easily be incapsulated in the molten alloy while the sodium retains its solid state. I also prefer this alloy because its melting point is considerably higher than atmospheric temperatures found in ordinary storage places. However, for special purposes and where the ambient temperature is high one of the other alloys with a higher melting point might be used.

In order to generate hydrogen, a pellet, lump, or ingot thus coated with the low temperature melting alloy is mechanically conveyed and introduced into a chamber containing water of elevated temperature approximately 200° F. This immediately causes the low temperature melting point alloy to melt exposing the sodium metal and permitting it to react with the water to cause decomposition of the water to hydrogen. The exothermic reaction of this process ignites the hydrogen producing intense heat. This heat might be intensified by the introduction of drafts of air (oxygen).

It is evident that the generation of hydrogen can be instantly controlled by increasing or decreasing the supply of pellets. When the supply of pellets is terminated, the hydrogen ceases to be generated and the process is immediately stopped.

A mechanical device within the reaction chamber controls the water level to the desired amount providing sufficient water to produce the reaction at the rate of the demand. A mechanically operated pumping device removes the molten alloy from the bottom of the chamber and cools it to the point of solidification for future use. A similar device removes the slurry of sodium hydroxide, a by-product of the reaction. This sodium hydroxide might be stored and reprocessed as a by-product or might be disposed of as a waste material.

The procedure described above is for the purpose of depicting the art and it is not to be considered as specific. Each or all its parts and components might be varied without departing from the essentials or the scope of my invention.

What I claim is:

1. A process for the production of hydrogen, which comprises introducing into a hydrogen generation zone metallic sodium incapsulated in a metal alloy having a melting point below the melting point of sodium, introducing water into said hydrogen generation zone, and contacting therein said incapsulated sodium and water at a temperature sufficient to melt said alloy, thereby enabling said metallic sodium and water to react to yield hydrogen.

2. The process of claim 1 wherein the metal alloy has a melting point in the range of from about 116° F. to 203° F.

3. The process of claim 1 wherein the metal alloy comprises bismuth, lead and at least one metal selected from the group consisting of tin, cadmium, and indium, said alloy having a melting point below the melting point of sodium.

4. The process of claim 1 wherein the metal alloy comprises 58% bismuth, 17% lead, and 25% indium, said alloy having a melting point of about 173.8° F.

5. The process of claim 4 wherein the incapsulated sodium is contacted with water at a temperature of about 200° F.

6. A process for the production of hydrogen, which comprises coating metallic sodium with a low melting point metal alloy having a melting point below the melting point of sodium, and contacting said coated sodium with water, which is at a temperature above the melting point of said metal alloy, to melt said alloy, thereby enabling the water and sodium to react to yield hydrogen.

7. The process of claim 6 wherein the alloy has a melting point in the range of from about 116° F. to 203° F.

8. The process of claim 6 wherein the metal alloy comprises bismuth, lead and at least one metal selected from the group consisting of tin, cadmium, and indium, said alloy having a melting point below the melting point of sodium.

References Cited by the Examiner

UNITED STATES PATENTS

| | | | |
|---|---|---|---|
| 1,497,970 | 6/1924 | Berkey | 126—263 |
| 2,667,865 | 2/1954 | Herman | 126—263 |
| 2,806,785 | 9/1957 | Doptoglon | 75—169 |
| 2,918,052 | 12/1959 | Budenholzer et al. | 126—263 |
| 3,181,848 | 5/1965 | Miller | 75—169 X |

CHARLES J. MYHRE, *Primary Examiner.*